June 3, 1941.   E. E. HESS   2,244,523
INDICATING MECHANISM FOR WEIGHING SCALES
Filed April 7, 1939   2 Sheets-Sheet 1
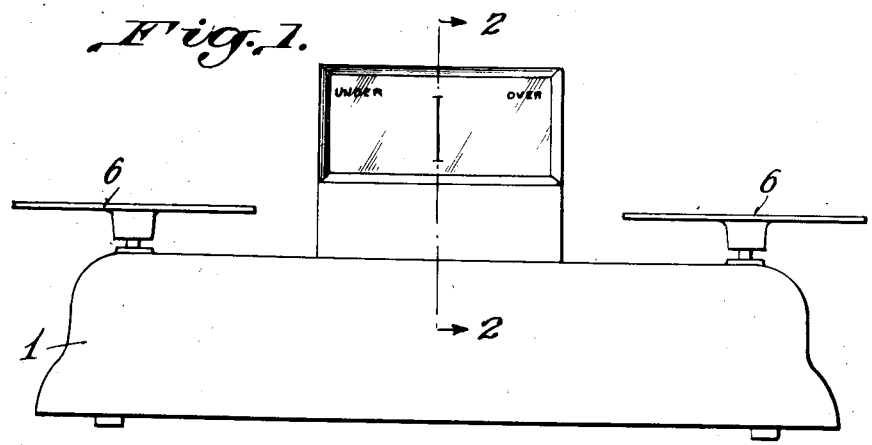
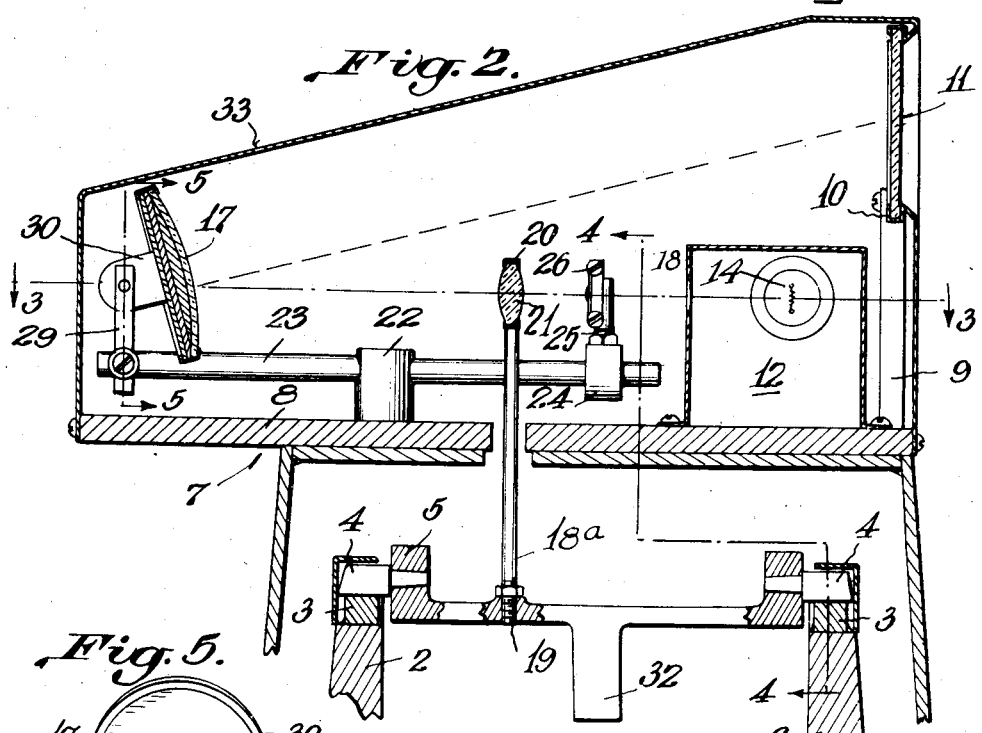
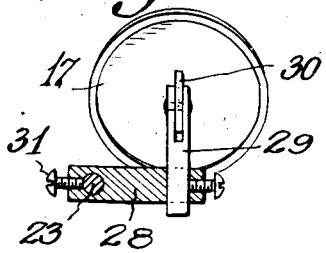
Inventor
Emerson Eugene Hess,
By W. S. McDowell
Attorney

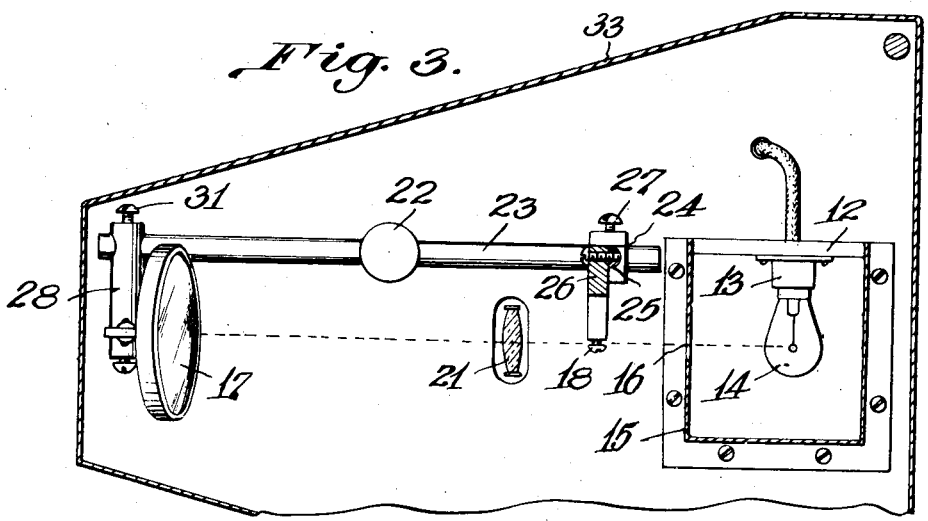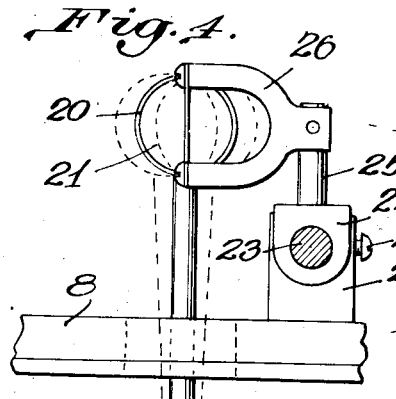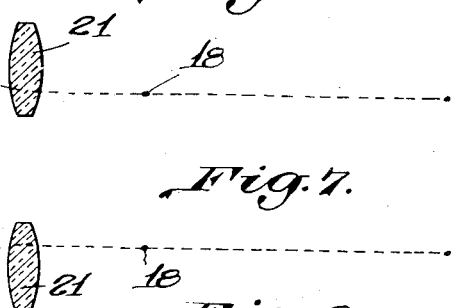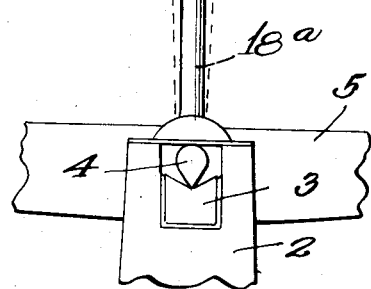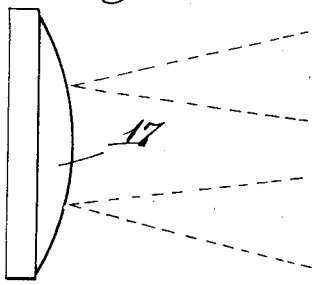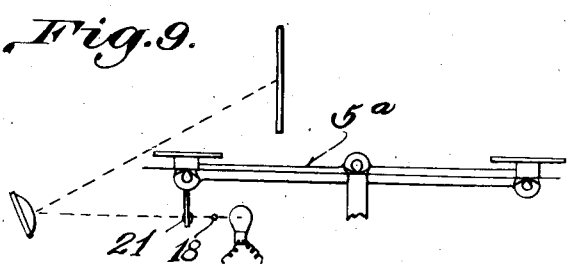

Patented June 3, 1941

2,244,523

UNITED STATES PATENT OFFICE 2,244,523

INDICATING MECHANISM FOR WEIGHING SCALES

Emerson Eugene Hess, Powell, Ohio

Application April 7, 1939, Serial No. 266,614

9 Claims. (Cl. 88—24)

This invention relates to weighing scales and is particularly directed to an optical type of indicating mechanism for use with such scales. The primary object of the invention resides in providing a scale with an illuminated dial and positioning a light intercepting member between the means for illuminating the dial and the latter to direct a shadow thereon. An optical lens is movably positioned between the light intercepting member and the dial to refract or bend the light rays passing therethrough and cause movement of the shadow on the dial.

Another object resides in supporting a reflector on an angle in the path of the light rays issuing from the illuminating means in order that the dial may be positioned adjacent the illuminating means to materially reduce the space required by the indicating mechanism.

A further object rests in employing a convex reflector so that the movement of the shadow will be multiplied between the optical lens and the dial to obtain a greater degree of accuracy in the indications.

Other objects will be apparent from the following description and the accompanying drawings in which the invention has been illustrated in its preferred form.

Fig. 1 is a side elevational view of an even balance type of scale provided with the indicating mechanism formed in accordance with the invention;

Fig. 2 is a vertical transverse sectional view taken on the plane indicated by the line II—II of Fig. 1;

Fig. 3 is a horizontal sectional view taken through the indicating mechanism on the plane indicated by the line III—III of Fig. 2;

Fig. 4 is a detail vertical sectional view taken on the plane indicated by the line IV—IV of Fig. 2;

Fig. 5 is a similar view on the plane indicated by the line V—V of Fig. 2;

Figs. 6, 7 and 8 are diagrammatic views illustrating the path of the light rays in various positions of movement, these figures showing how the principle of refraction is employed to give the indications;

Fig. 9 is a diagrammatic view of a modified form of the invention in which the indicating element moves in a vertical plane.

Referring more particularly to the drawings, the numeral 1 designates the base of an over and under scale of the even balance type. While the indicating mechanism has been illustrated in connection with this type of scale, it is to be understood that its use is not restricted thereto as the principle may be used on any scale provided with a movable member. Mounted within the base 1 is a pair of fulcrum stands 2 in the upper ends of which are mounted V-type bearings 3. These bearings receive knife-edge pivots 4 carried by the scale beam 5 for pivotal support thereof. The outer ends of the beam support balance weight and commodity-receiving platforms 6 as is usual in scales of this type. By placing a weight on one of the platforms, the beam will be rocked about the center provided by the pivots 4. This movement will be counteracted by placing a weight of suitable size on the other platform and to notify the operator when the scale is in balance, the indicating mechanism designated generally by the numeral 7 is provided.

This indicating mechanism comprises a base plate 8 which is suitably secured, in the present instance, to the scale base 1 directly over the fulcrum stands 2. The base plate 8 supports at its forward end a pair of vertically extending posts 9 which at their upper ends support a rectangular frame 10 in which is clamped a ground glass dial 11. Below the dial, the base plate also supports a small panel 12 to which is fastened a lamp base 13. A small incandescent lamp 14 is removably positioned in the socket. A small housing 15 surrounds the lamp and is provided on one side with a reduced opening 16 through which a beam of light is directed toward the rear of the scale. This beam is reflected by an inclined mirror 17 onto the dial 11 to entirely illuminate it. Immediately in front of the opening 16, a vertically extending wire 18 is supported to intercept some of the light and cause a shadow to fall on the mirror which shadow will be reflected onto the screen. The wire is so positioned that the shadow will fall directly across the center of the mirror and the position of the latter is such that the shadow will coincide with a vertical line formed on the center of the dial. The mirror 17 is of convex formation, the purpose of which will be hereinafter set forth.

An opening is provided in the base plate 8 to permit a rod 18ª to extend therethrough, the lower end of the rod being secured as at 19 to a transverse brace forming a part of the beam 5. The upper end of the rod 18ª supports a ring 20 in which is secured a double convex optical lens 21. The center of the lens is positioned, when the scale is in balance, on a direct line extending from the filament of the lamp 14 to the center of the reflector 17. By this arrangement, the shadow produced by the wire 18 will also pass directly through the center of the lens 21 when the scale beam is at rest.

As illustrated in Figs. 6, 7 and 8, when the lens 21 is moved to either side of the line extending between the lamp and the mirror, the shadow of the wire 18 will be refracted or bent in the same direction of movement of the lens. This bending of the shadow will cause its movement over the convex surface of the reflector and corresponding movement of the shadow on the dial. By reason of the convexity of the reflector, the movement of the shadow will be multiplied between the lens and the dial so that a greater indication will be rendered. As shown in Fig. 7, when the lens 21 moves in the opposite direction, the shadow will be refracted also in this direction and similar movement will be imparted to the shadow on the dial.

The indicator wire 18 and the reflector 17 are adjustably supported by providing the base plate 8 with a short post 22 which supports a horizontally extending bar 23. The forward end of the bar adjustably receives a block 24 into which a stud 25 is threaded, the stud receiving a yoke-shaped bracket 26 to the spaced ends of which is secured the indicator wire 18. The position of the block on the bar 23 is maintained by providing the block with a set screw 27. By loosening the set screw, the indicator wire may be moved toward or away from the lens 21 to cause a distinct shadow to be thrown on the reflector 17. The particular mounting of the yoke member 26 enables this member to be adjusted to centralize the indicator wire in the beam issuing through the opening 16.

Adjustment of the reflector 17 is provided in a manner similar to that of the indicator wire by providing the rear end of the bar 23 with a laterally extending arm 28, the outer end of which receives a clevis pin 29 in the upper end of which is supported a plate 30 secured to the back of the reflector. A single pivot extends through the clevis 29 and the plate 30 and provides for pivotal movement of the reflector in a vertical plane.

The arm 28 may be adjusted about the axis of the bar 23 when additional movement is required in the adjusting operation. The position of the arm 28 is maintained by a set screw 31. After the indicator 18 and the mirror 17 have been adjusted to the proper position, no further adjustment is necessary in the operation of the device.

As shown in Fig. 9, the lens 21 may be supported for vertical movement by connecting it with the outer end of the beam 5ᵃ. When the lens is thus positioned, the indicator wire will be arranged horizontally and the dial placed vertically so that the shadow will move up and down on the dial.

In view of the foregoing, it will be apparent that an indicating mechanism has been provided which employs the refracting properties of a lens to provide movement of the indicating medium. There is no direct connection between the indicating mechanism and the movable elements of the scale and greater accuracy can be attained by the elimination of friction.

It may be found desirable to offset the weight of the rod 18 and the lens 21 by forming a counterweight 32 on the opposite side of the beam. A housing 33 surrounds the indicating mechanism to prevent the accumulation of dirt and other foreign matter thereon and also to prevent extraneous light rays from striking the dial and destroying the effect of the shadow.

While but two modifications of the invention have been illustrated, it is obvious that many minor changes may be made therein without departing from the spirit and scope of the invention as set forth in the following claims.

I claim:

1. In combination with a weighing scale having a movable member, a screen, a light source, a convex reflector for deflecting a beam of light onto said screen, light intercepting means disposed between said light source and said reflector for normally casting a shadow across the center of said mirror to be reflected thereby onto said screen, and a double convex lens supported by the movable member of the scale between the light intercepting means and the reflector, the shadow caused by said intercepting means normally passing through the center of said lens, movement of the lens laterally with respect to the shadow serving to refract the shadow as it passes through the lens and cause movement of the shadow on the reflector and screen, the convexity of the mirror serving to multiply the movement of the shadow on said screen.

2. In a weighing scale of the type having a movable member, a support, a screen mounted on said support, a light source, a convex mirror mounted for universal adjustment on said support in a position to reflect a beam of light from said light source onto said screen, a shadow producing device mounted for universal adjustment on said support between said light source and said mirror, and a lens carried by the movable member of said scale between the shadow producing device and said mirror, the centers of said light source, indicator, lens, mirror and screen being disposed in the same plane when in a normal position, movement of said lens to either side of said plane serving to bend the light rays to cause movement of said shadow on said screen.

3. Indicating mechanism for weighing scales of the type having a movable element, comprising a screen, means for directing a beam of light onto said screen, means for casting a substantially linear shadow on said screen, means fixedly supporting said shadow casting means in the path of the beam of light, an optical lens independent of said shadow casting means, and means on the movable element of the scale for supporting said lens between said shadow casting means and said screen for movement in a plane substantially normal to the optical axis of the system, movement of said lens serving to refract the shadow as it passes through the lens to cause said shadow to move on said screen.

4. Indicating mechanism for weighing scales of the type having a movable element, comprising a screen, means for directing a beam of light onto said screen, means for casting a substantially linear shadow on said screen, means fixedly supporting said shadow casting means in the path of the beam of light, an optical lens independent of said shadow casting means, and means on the movable element of the scale for supporting said lens between said shadow casting means and said screen for movement in a plane substantially normal to the optical axis of the system, and about an axis substantially parallel to the optical axis and normal to the image forming line, movement of said lens serving to refract the shadow as it passes through the lens to cause said shadow to move on said screen.

5. Indicating mechanism for weighing scales of the type having a movable element comprising a screen, means for producing a beam of light, reflector means disposed in the path of said beam to redirect it onto said screen, light interrupting means fixedly disposed in the beam between its producing means and said reflector means for casting a shadow on said screen, and an optical lens supported by the movable element of the scale independently of said shadow casting means, said lens being moved through the beam of light between said shadow casting means and said reflector means in a plane substantially normal to the longitudinal axis of the beam.

6. Indicating mechanism for weighing scales of the type having a movable element, comprising a screen, means for producing a beam of light, reflector means disposed in the path of said beam to redirect it onto said screen, light interrupting means fixedly disposed in the beam between its producing means and said reflector means for casting a shadow on said screen, and an optical lens supported by the movable element of the scale independently of said shadow casting means, said lens being moved through the beam of light between said shadow casting means and said reflector means in a plane substantially normal to the longitudinal axis of the beam, and means connected with said shadow casting means and said reflector means for effecting universal adjustment thereof.

7. Indicating means for a weighing scale of the type having a pivoted member, comprising a screen, means for producing a beam of light, a convex reflector disposed in the path of said beam to redirect it onto said screen, means disposed in the beam of light between the producing means and the reflector to cast a substantially linear shadow on said screen, and an optical lens carried by the pivoted member of the weighing scale between said shadow casting means and said reflector, said lens being independent of said shadow casting means and rockable across the beam of light upon movement of the pivoted member of the scale about an axis substantially parallel with the optical axis of said beam of light.

8. Indicating mechanism for a weighing scale comprising a vertical screen having a horizontally disposed longitudinal axis, means for directing a beam of light onto said screen, a substantially vertical indicator member fixedly supported in said beam of light to cast a shadow-like image onto said screen, lens means disposed in said beam of light between said indicator member and said screen, and means connected with the operating mechanism of the weighing scale for supporting said lens for movement in a plane substantially normal to the optical axis of the light beam system and about an axis substantially parallel to the optical axis whereby the vertical image of the indicator on the screen will move in a substantially horizontal direction.

9. Indicating mechanism for weighing scales of the type having a movable element, comprising a screen, means for directing a beam of light onto said screen, means stationarily disposed in said beam of light for forming a substantially linear image source, means for casting said image on said screen including an optical lens carried by the movable element of the scale, said lens being independent of the linear image source means and moved by the movable element of the scale across the light beam in a plane substantially normal to the optical axis of said beam.

EMERSON EUGENE HESS.